United States Patent Office 2,879,247
Patented Mar. 24, 1959

2,879,247

MOLDED SEALING ELEMENT

Bernard William Bradford and Wilfred Jesse Skinner, Norton-on-Tees, England, assignors, by mesne assignments, to the United States of America as represented by the United States Atomic Energy Commission No Drawing. Application September 24, 1946
Serial No. 699,073

6 Claims. (Cl. 260—41)

This invention relates to molded sealing elements suitable for use under conditions involving rubbing friction with exposure to the vapor of uranium hexafluoride, for example in the shaft gland of a compressor handling uranium hexafluoride, and to molding compositions therefor.

The problem of providing a sealing element which is capable of withstanding exposure to the vapor of uranium hexafluoride for a reasonable period and at the same time possesses a suitably low rate of wear and low coefficient of friction, has been proved to be difficult.

Both amorphous and graphitic carbons have been found to be attacked by uranium hexafluoride and contrary to the general observation that the resistance of carbons to chemical attack increases with the degree of graphitisation, graphitic carbons are much more severely attacked than amorphous carbon by uranium hexafluoride. The attack can be lessened by incorporating with the carbon some other material which is capable of impeding the access of the uranium hexafluoride vapor to the carbon, but although this method prevents the disintegration over long periods of amorphous carbons it does not admit of the use of graphitic carbons which are much to be preferred because of their superior wear-resistance and lower frictional resistance.

It is an object of the invention to provide moldable compositions and moldings produced therefrom in which the above disadvantages are overcome.

A further object of the invention is to provide a treatment for graphitic carbon rendering it suitable for incorporation in such molding compositions.

We have now found that these objects can be achieved by subjecting graphitic carbons to a preliminary treatment with the vapor of uranium hexafluoride and then incorporating polytetrafluorethylene in them; a composition is obtained which has good wear-resistant and frictional properties and is resistant to disintegration by uranium hexafluoride over long periods.

In a preferred method of carrying the invention into effect graphitic carbon in the form of a granular powder is heated in an evacuated vessel to de-gas it, preferably at a temperature of about 100° C. After cooling to room temperature uranium hexafluoride vapor is introduced into the vessel and allowed to remain in contact for a period of the order of 24 hours. The excess uranium hexafluoride vapor is then removed by evacuation and the product of the treatment is found to be completely broken down with little trace of its original structure. The product is then ground, e.g., in a Christy-Norris mill, and an approximately equal weight of polytetrafluorethylene also ground to a powder in such a mill is mixed with the powdered product as thoroughly as possible by hand and further mixed by grinding the mixture in a Christy-Norris or similar mill. The intimately mixed powdered material is then introduced into a mold and subjected to pressure, e.g., approximately 2½ tons per square inch. The strength of the moldings may be further improved by subjecting them to a heat treatment preferably in the range 380° C.–420° C. Heating at a temperature of 400° C. for a period of 3–4 hours has been found to be suitable. Slight changes in dimensions are found to occur during heating, and it is preferable to carry out the heating in the mold after pressing.

Instead of using granular graphitic carbon as starting material, graphitic carbon in massive or lumpy form may be used, but in this case it is generally found that exposure to uranium hexafluoride vapor needs to last for several days to ensure completeness of reaction and disintegration of the product.

The proportions of polytetrafluorethylene to treated graphitic carbon in the moldable composition may vary between wide limits, as stated above equal proportions by weight give satisfactory results.

It will be appreciated that the molded sealing elements in accordance with the invention may be molded to any desired shape, thus the sealing elements may be so shaped as to surround a rotating or reciprocating shaft or may be formed as thrust washers or the like.

We claim:

1. A moldable composition comprising in admixture polytetrafluorethylene and the product of treating graphitic carbon with uranium hexafluoride vapor.

2. A moldable composition as claimed in claim 1 and comprising a homogeneous mixture of the ingredients in approximately equal proportions by weight and in powdered form.

3. The manufacture of a sealing element which comprises the steps of molding under pressure without application of heat a composition comprising a mixture of polytetrafluorethylene and the product of treating graphitic carbon with uranium hexafluoride vapor, and subjecting the molding to heat treatment at a temperature in the range 380° C. to 420° C.

4. The manufacture of a sealing element by molding under a pressure of approximately 2½ tons per square inch, a composition comprising a homogeneous mixture in powdered form of polytetrafluorethylene and the product of reaction between graphitic carbon and uranium hexafluoride vapor, and heating said composition at a temperature of 380° C.–420° C. for a period of 3–4 hours.

5. A process as claimed in claim 4 in which the heat treatment is effected in the mold after pressing.

6. A sealing element comprising a molded mass of mixed polytetrafluorethylene and the product of reaction between graphitic carbon and uranium hexafluoride vapor.

References Cited in the file of this patent

UNITED STATES PATENTS

| | | |
|---|---|---|
| 1,224,014 | Parsons | Apr. 24, 1917 |
| 2,400,099 | Brubaker et al. | May 14, 1946 |